No. 869,265. PATENTED OCT. 29, 1907.
S. G. ROBINSON, Jr.
BROODER.
APPLICATION FILED FEB. 7, 1907.

2 SHEETS—SHEET 1.

WITNESSES
O. B. Buenziger.
E. M. Brown.

INVENTOR
S. G. Robinson Jr.
By Edward N. Pagelsen Attorney

No. 869,265. PATENTED OCT. 29, 1907.
S. G. ROBINSON, JR.
BROODER.
APPLICATION FILED FEB. 7, 1907.
2 SHEETS—SHEET 2.
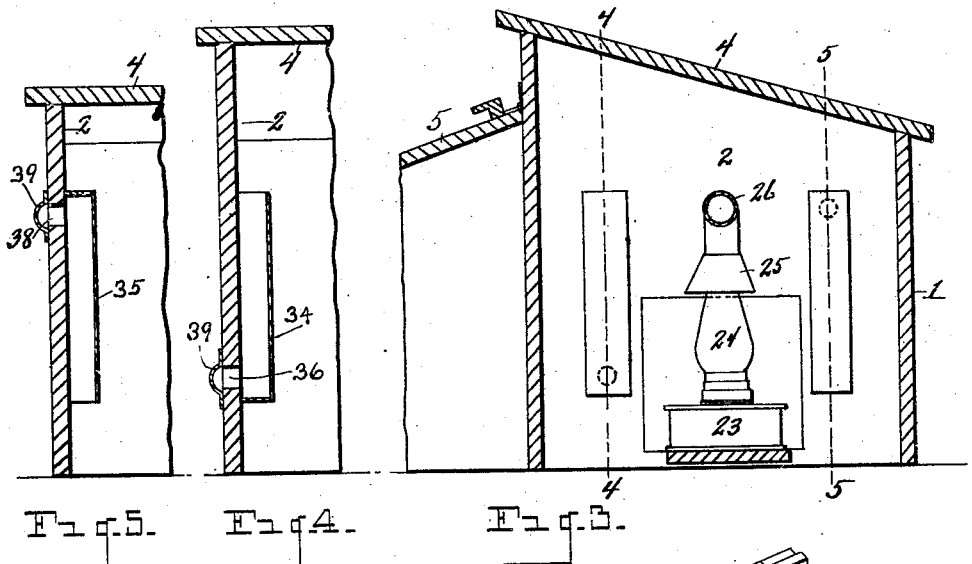
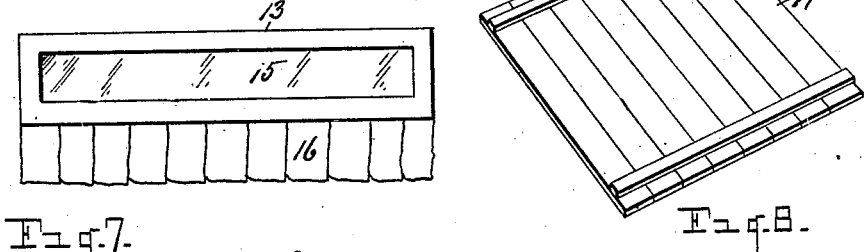
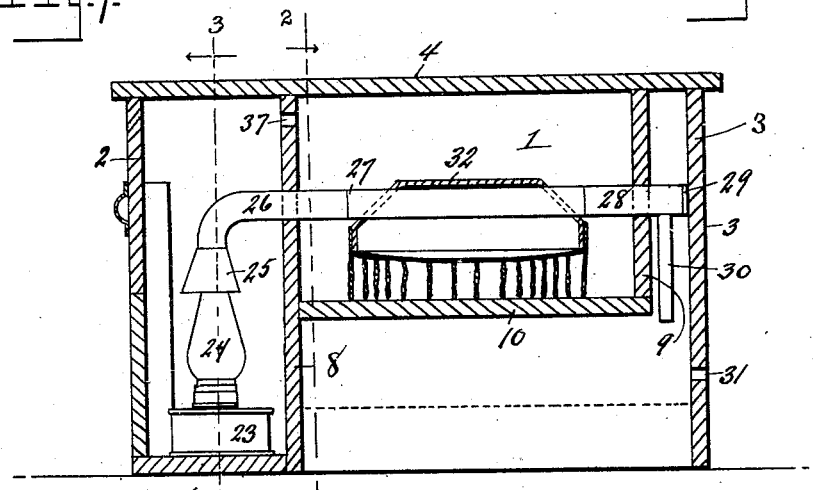
WITNESSES
O. B. Brenziger.
E. M. Brown.
INVENTOR
S. G. Robinson, Jr.
By Edward N. Pagelsen Attorney

UNITED STATES PATENT OFFICE.

SAMUEL G. ROBINSON, JR., OF WEST TOLEDO, OHIO.

BROODER.

No. 869,265.  Specification of Letters Patent.  Patented Oct. 29, 1907.

Application filed February 7, 1907. Serial No 356,200.

*To all whom it may concern:*

Be it known that I, SAMUEL G. ROBINSON, Jr., a citizen of the United States, and a resident of West Toledo, in the county of Lucas and State of Ohio, have invented a new and Improved Brooder, of which the following is a specification.

My invention relates to brooders for young chickens, and the objects of my improvements are,—to provide a brooder that shall be as effective as a hen; and to provide a brooder with a compartment that is well lighted, in which the young chicks may be fed and exercise during inclement weather.

Figure 1:
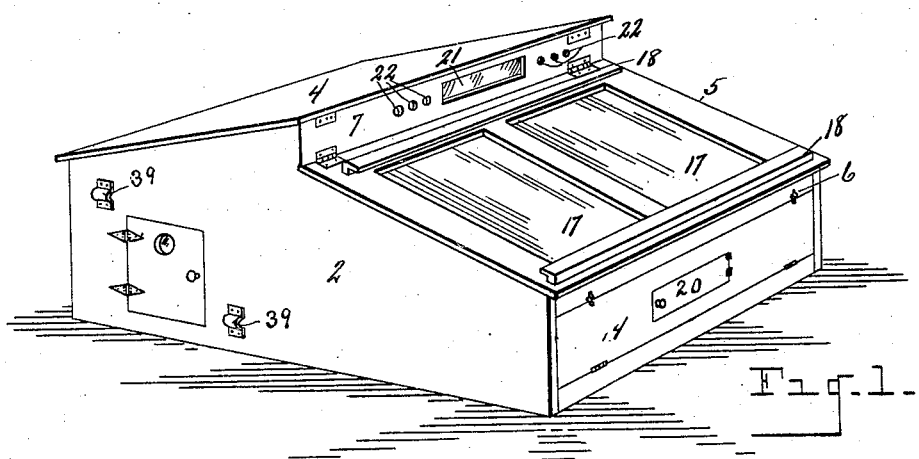
Figure 7:
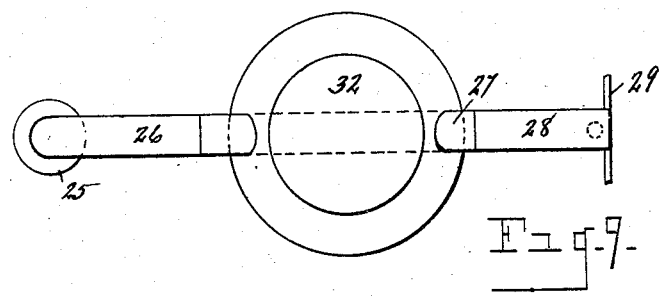
Figure 2:
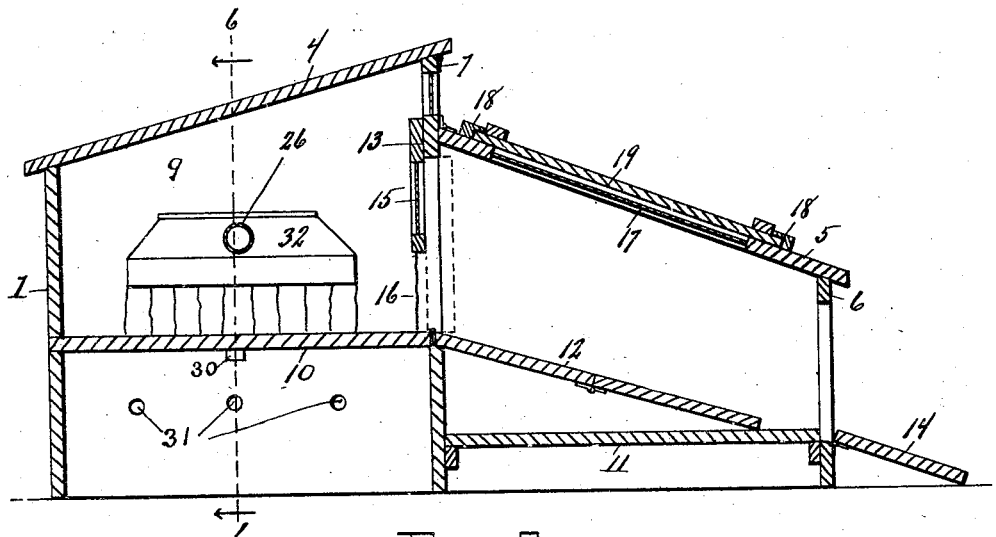

In the accompanying drawings which illustrate my invention, Figure 1 is a general view of the brooder. Fig. 2 is a vertical cross section of the same on the line 2—2 of Fig. 6. Fig. 3 is a cross section on the line 3—3 of Fig. 6. Figs. 4 and 5 are cross sections on the lines 4—4 and 5—5 respectively. Fig. 6 is a cross section on the line 6—6 of Fig. 2. Fig. 7 is a view of the partition and curtain between the brooder and feeding chambers. Fig. 8 is a view of a cover. Fig. 9 is a view of the heater.

Similar reference characters refer to like parts throughout the several views.

The brooder is formed generally of the back 1, the ends 2 and 3, the top 4 of the brooder chamber, the hinged top 5 of the feeding chamber, the front 6, the cross frame 7, the partitions 8 and 9, and the floors 10 and 11.

The door 12 between the feeding and brooder chambers is hinged in the middle, as shown in Fig. 2, so it may be folded up to dotted position against the partition 13, or laid down to form a runway into the feeding chamber. The front 6 is provided with a door 14, which may be let down to form a runway for the chicks to pass out into the open. The partition 13 is provided with a window 15 and a curtain 16, formed of strips of cloth, that closes the opening under the frame of the window. The hinged top of the feeding chamber is provided with windows 17. Guides 18 serve to retain the shutter 19, which may be secured over the windows 17 during very inclement weather. The door 14 may be provided with a small auxiliary door 20. The cross frame 7 is provided with a window 21 and ventilating openings 22.

Between the side 2 and the partition 8, is placed the lamp 23, having a chimney 24 extending up into the funnel 25. A pipe 26 extends through the partition 8 and connects to the section 27. A section 28 connects to the opposite end of section 27 and has its further end closed and is secured to the end 3 of the brooder by means of the plate 29. A smaller pipe 30 extends down and permits the hot gas from the lamp to pass below the floor 10 and thence out through the openings 31. This hot gas keeps the floor of the brooding chamber warm.

The hover is formed of the inverted metal reflector 32 secured on the section 27, from which strips of cloth 33 hang down. The chicks will pass in and remain between these strips of cloth and be warmed by the heat from the reflector 32.

Secured to the side 2 are two ventilators, 34 and 35, each closed at one end. Opening 36 permits cold air to enter ventilator 34 when it will be warmed and rise, passing into the lamp chamber and also into the brooder chamber through opening 37 in the partition 8. The foul air will pass up the ventilator 35 and out through opening 38. Shields 39 over the openings 36 and 38 prevent snow and rain blowing in. Similar shields may be placed over the other openings, and any other means may be employed to attain the same result.

The chicks remain under the hover at night and when cold, but during the day will pass back and forth between the feeding chamber and the hover chamber. The lights to the feeding chamber cause this to be a good "sun parlor." The warm air from the lamp causes the floor of the hover chamber to remain warm at all times.

Having now explained my improvements, what I claim as my invention and desire to secure by Letters Patent is:—

1. In a brooder, the combination of a feeding chamber, a cover for the same provided with windows, a hover chamber, a curtained doorway between the two chambers, a folding door so positioned as to be adapted to close the doorway or to form a runway between the chambers, a heater compartment, a heater therein, and pipes connected to said heater passing through the hover chamber and extending down so as to discharge heated air below the floor of said hover chamber.

2. In a brooder, the combination of a hover chamber having an elevated floor, a hover mounted therein consisting of an inverted reflector and depending strips of cloth, a hot air pipe passing through the walls of the hover chamber and through said reflector, a second chamber, a branch pipe connected to said hot air pipe in said second chamber and extending down so as to be adapted to discharge heated air in the space below the floor, a heater chamber adjacent to the hover chamber, an elbow connected to the end of the heater pipe which extends through the partition between the heater and hover chambers, and a heater adapted to cause hot air to pass through the hover chamber, the walls of the heater chamber being provided with ventilating openings.

In testimony whereof I have signed my name in the presence of two subscribing witnesses.

SAMUEL G. ROBINSON, JR.

Witnesses:
  WM. C. MILLER,
  JNO. E. MICKS.